(12) United States Patent
Miyasa et al.

(10) Patent No.: US 9,123,096 B2
(45) Date of Patent: Sep. 1, 2015

(54) INFORMATION PROCESSING APPARATUS AND CONTROL METHOD THEREOF

(71) Applicant: CANON KABUSHIKI KAISHA, Tokyo (JP)

(72) Inventors: Kazuhiro Miyasa, Yokohama (JP); Kiyohide Satoh, Kawasaki (JP); Toru Maeda, Mitaka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 13/739,299

(22) Filed: Jan. 11, 2013

(65) Prior Publication Data

US 2013/0188851 A1 Jul. 25, 2013

(30) Foreign Application Priority Data

Jan. 24, 2012 (JP) ................................ 2012-012434

(51) Int. Cl.
  *G06K 9/00* (2006.01)
  *G06T 7/00* (2006.01)
  *A61B 8/00* (2006.01)

(52) U.S. Cl.
  CPC ............ *G06T 7/0012* (2013.01); *G06T 7/0024* (2013.01); *G06T 2207/10081* (2013.01); *G06T 2207/10088* (2013.01); *G06T 2207/10132* (2013.01); *G06T 2207/30068* (2013.01)

(58) Field of Classification Search
  USPC ......... 382/100, 103, 106, 128–134, 154, 168, 382/173, 181, 189, 199, 232, 254, 274, 276, 382/285, 291, 305, 312; 600/443, 437, 424; 378/4, 21
  See application file for complete search history.

(56) References Cited

U.S. PATENT DOCUMENTS

| | | | | |
|---|---|---|---|---|
| 2007/0239004 A1* | 10/2007 | Kakee et al. | .................. | 600/437 |
| 2007/0239009 A1* | 10/2007 | Kawashima et al. | .......... | 600/437 |
| 2007/0287915 A1* | 12/2007 | Akaki et al. | ................... | 600/443 |
| 2007/0299336 A1* | 12/2007 | Ikuma et al. | ................... | 600/424 |
| 2008/0221446 A1 | 9/2008 | Washburn et al. | ............. | 600/437 |
| 2010/0324422 A1* | 12/2010 | Wanda et al. | ................. | 600/443 |
| 2011/0216958 A1* | 9/2011 | Satoh et al. | ................... | 382/131 |
| 2011/0262015 A1 | 10/2011 | Ishikawa et al. | .............. | 382/128 |
| 2012/0179040 A1 | 7/2012 | Arai et al. | ..................... | 600/443 |
| 2012/0262460 A1 | 10/2012 | Endo et al. | ..................... | 345/441 |

(Continued)

FOREIGN PATENT DOCUMENTS

| | | |
|---|---|---|
| JP | 2008-086742 | 4/2008 |
| JP | 2008-212680 | 9/2008 |
| JP | 2008-246264 | 10/2008 |
| JP | 2008-279272 | 11/2008 |

(Continued)

*Primary Examiner* — Seyed Azarian
(74) *Attorney, Agent, or Firm* — Fitzpatrick, Cella, Harper & Scinto

(57) ABSTRACT

In an information processing apparatus, an ROI acquisition unit acquires a position of an ROI in an object. A position/orientation acquisition unit acquires a position and orientation of a tomographic image acquired by an ultrasonic probe. A processing-target region acquisition unit acquires a processing-target region defined based on the position of the ROI. A calculation unit calculates a cross area between the processing-target region and the tomographic image based on the position and orientation of the tomographic image. A display control unit displays the tomographic image and an outline image indicating an approximate outline of a portion to be examined, and also displays information indicating the cross region on the outline image.

11 Claims, 10 Drawing Sheets

(56) References Cited

U.S. PATENT DOCUMENTS

2013/0051646 A1 2/2013 Nakano et al. ............... 382/131
2013/0195339 A1 8/2013 Endo et al. .................. 382/131

FOREIGN PATENT DOCUMENTS

JP 2013-165936 8/2013
WO WO 2012/137451 10/2012

* cited by examiner

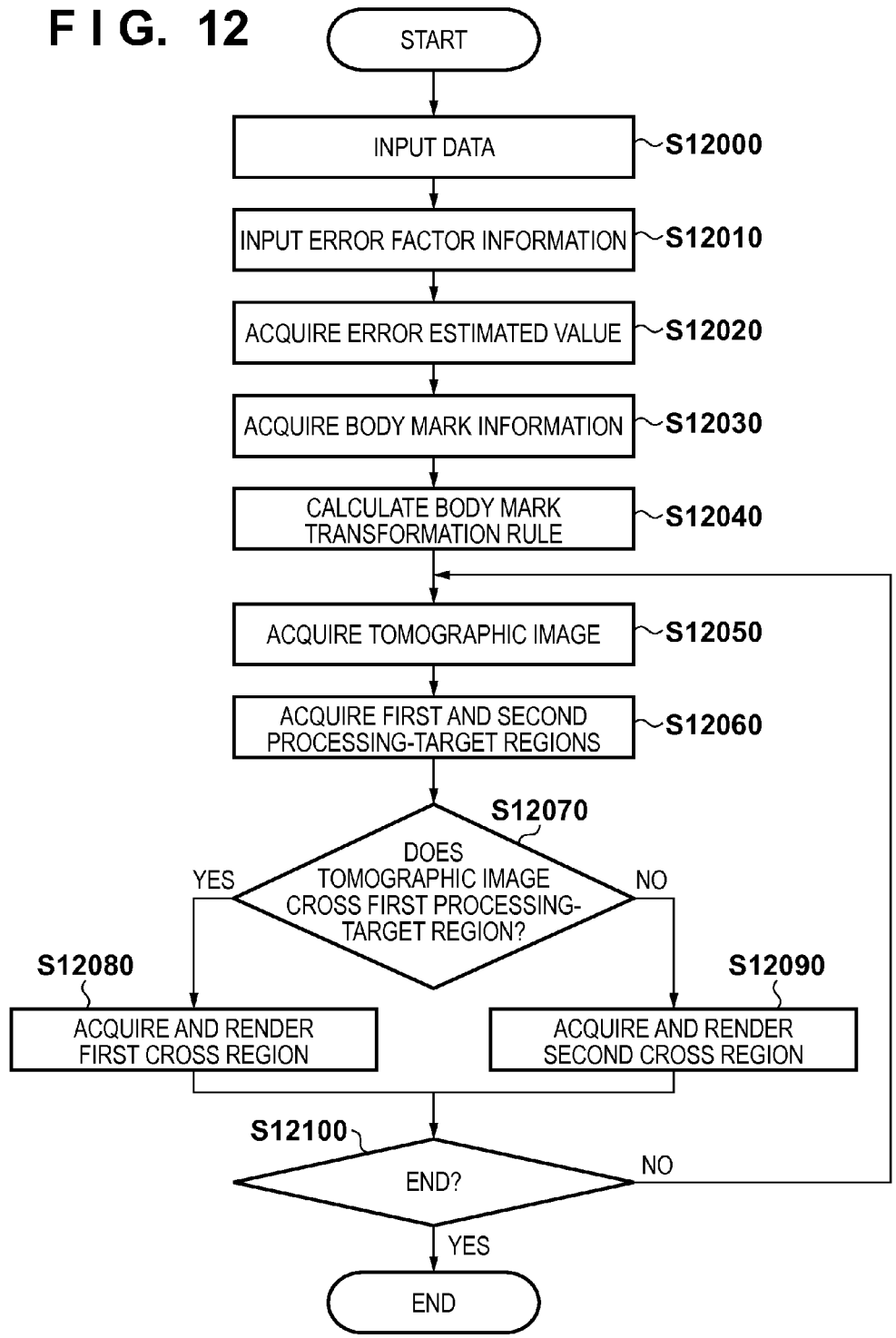

INFORMATION PROCESSING APPARATUS AND CONTROL METHOD THEREOF

BACKGROUND OF THE INVENTION

1. Field of the Invention

The present invention relates to an information processing apparatus required to efficiently search for regions corresponding to a region of interest between images having different imaging conditions such as modality (e.g., ultrasound, MRI, etc.), imaging body posture, imaging date and time, and a control method thereof.

2. Description of the Related Art

In the medical field, a doctor diagnoses a lesion area by displaying, on a monitor, a medical image (three-dimensional image data including a tomographic image group which represents three-dimensional information inside an object) obtained by capturing images of the object, and interpreting the displayed medical image. As medical image collection apparatuses used to capture the medical image (referred to as "modality" herein), an ultrasonic image diagnosis apparatus, magnetic resonance imaging apparatus ("MRI"), X-ray computed tomography apparatus ("X-ray CT apparatus"), and the like are known.

It is difficult to correctly diagnose the state of a lesion area by merely observing medical images captured by these individual modalities. Hence, attempts have been made to correctly diagnose the state of a lesion area by comparing lesion areas in medical images captured using different modalities or captured at different dates and times.

In order to use a plurality of types of medical images in diagnosis, it is important to identify (associate) lesion areas and the like in the respective medical images. Since it is difficult to attain automatic identification by means of image processing due to the influence of using different modalities, deformations of the object, and the like, it is common practice for an operator such as a doctor to manually identify lesion areas while observing the images. The operator observes an image of a lesion area of interest pointed out in one medical image (referred to as a "reference image" hereinafter) to examine similarities of the shape of the lesion area, the appearance of its surrounding portion, and the like. Then, the operator searches for and identifies a lesion area ("corresponding lesion area") corresponding to that lesion area from another medical image (to be referred to as a "target image" hereinafter) based on these pieces of information. In this case, if an apparatus which presents a medical image has a function of estimating and presenting the position of the corresponding lesion area on the coordinate system of the target image based on that of the lesion area of interest on the coordinate system of the reference image, the operator can search for the corresponding lesion area based on that estimated position.

Thus, an attempt has been made to calculate a relationship between the coordinate systems of an ultrasonic tomographic image as a target image and a reference image by measuring the position and orientation of an ultrasonic probe and to estimate the position of the corresponding lesion area on the coordinate system (ultrasonic coordinate system) of the ultrasonic tomographic image, thereby guiding an operation of the probe. For example, Japanese Patent Laid-Open No. 2008-246264 discloses a technique which calculates a distance and direction to the center of a target (lesion area of interest) set on a reference image (a three-dimensional tomographic image obtained using an MRI apparatus or the like) with respect to the current ultrasonic tomographic image, and displays an three-dimensional arrow image and numerical values based on the distance and direction. Then, since the user can visually recognize the distance from the current ultrasonic tomographic image to the target, he or she can easily recognize the correspondence (positional relationship) between the reference image and the ultrasonic tomographic image.

Also, Japanese Patent Laid-Open No. 2008-212680 discloses a technique which superimposes, when image tracking points (of a lesion area of interest) selected from a previous ultrasonic tomographic image are given, a square having a size and color based on distance and direction from the current ultrasonic tomographic image on the current ultrasonic tomographic image as an in-plane pointer. Thus, upon counting the number of nodules in a thyroid, the number of metastases in a liver, and the like, even when the angle and position of a probe are changed, the user can discriminate whether the currently visualized structure is one that is being newly identified or has already been identified and counted.

The measurement precision with which the position and orientation of an ultrasonic probe are measured is not perfect, and the shapes of an object at the capturing timings of the reference image and ultrasonic tomographic image do not always match. For this reason, the estimated position of the corresponding lesion area on the coordinate system of the ultrasonic tomographic image includes errors, and has a positional shift from that of the actual corresponding lesion area. However, the display processes disclosed in Japanese Patent Laid-Opens Nos. 2008-246264 and 2008-212680 do not consider any positional shift. For this reason, the user may not identify (find) the corresponding lesion area, depending on a degree of the positional shift. In this case, the user consequently searches the entire ultrasonic tomographic image for the corresponding lesion area, resulting in poor search efficiency.

Hence, the present inventors have proposed a technique for solving this problem, in Japanese Patent Application No. 2011-084495. According to this literature, a range (existence range) where the corresponding lesion area may be on the ultrasonic tomographic image is calculated in consideration of position estimation errors. Then, the existence range is presented on the ultrasonic tomographic image as a guide used when the user searches for the corresponding lesion area. Then, since the user can recognize a range (search range) where the corresponding lesion area is to be searched for, he or she can efficiently search for and identify the corresponding lesion area.

On the other hand, as a method of improving search efficiency by allowing the user to refer to the positions of the corresponding lesion area to be searched for and the ultrasonic tomographic image in an overview manner, information of a lesion area in a medical image and position information of a probe are displayed on a body mark which represents an outline shape of a target object. For example, Japanese Patent Laid-Open No. 2008-086742 discloses a method of calculating a transformation rule required to attain coordinate transformation from a position on a breast of a patient at the time of ultrasonography onto a standard body mark which represents a breast, and displaying a position of an ultrasonic probe on the body mark (by normalizing that position to that on the body mark coordinate system). Also, Japanese Patent Laid-Open No. 2008-279272 discloses a method of generating a 3D body mark by volume rendering of a target object captured by an X-ray CT apparatus or MRI apparatus, and displaying graphics indicating positions of a lesion area and probe on the 3D body mark to overlap each other. This method can support a probe operation when a doctor searches for a lesion area at the time of ultrasonography.

However, since Japanese Patent Application No. 2011-084495 merely displays one section of the three-dimensional existence range of the corresponding lesion area, it is not easy to recognize which location of the three-dimensional existence range is extracted. For example, when the three-dimensional existence range is given as a sphere, a two-dimensional existence range on the tomographic image is always displayed as a circle independently of which crossing portion between the ultrasonic tomographic image and three-dimensional existence range is the one being displayed. Therefore, it is not easy for the user who does not know the size of the sphere to recognize whether the current cross position is near the center of the sphere or the end of the sphere. When the ultrasonic tomographic image does not cross the existence range, it is not easy to recognize how far the ultrasonic probe must be moved ("moving distance" of the probe) to reach the existence range.

On the other hand, in Japanese Patent Laid-Open No. 2008-086742, since the position of the lesion area on the 2D body mark cannot be recognized, it is difficult to improve search efficiency. Also, in Japanese Patent Laid-Open No. 2008-279272, since the doctor has to recognize the positional relationship between the ultrasonic tomographic image and lesion area on the 3D body mark, which may be unfamiliar and unlike the familiar 2D body mark, the search efficiency may often drop. Furthermore, even when the ultrasonic tomographic image and the position of the lesion area are displayed on the 2D body mark based on Japanese Patent Laid-Open Nos. 2008-086742 and 2008-279272, a three-dimensional positional relationship between the ultrasonic tomographic image and corresponding lesion area as well as the depth direction of the body mark cannot be recognized. For this reason, an accurate moving distance of the ultrasonic probe required to capture the corresponding lesion area cannot be detected.

As described above, according to the above-described documents, the positional relationship between the corresponding lesion area or a region defined based on the corresponding lesion area and the ultrasonic tomographic image cannot be easily recognized.

SUMMARY OF THE INVENTION

According to one aspect of the present invention, there is provided an information processing apparatus comprising: an ROI acquisition unit configured to acquire a position of an ROI (Region Of Interest) in an object; a position/orientation acquisition unit configured to acquire a position and an orientation of a tomographic image acquired by an ultrasonic probe; a processing-target region acquisition unit configured to acquire a processing-target region defined based on the position of the ROI; a calculation unit configured to calculate a cross area between the processing-target region and the tomographic image based on the position and the orientation of the tomographic image; and a display control unit configured to display the tomographic image and an outline image indicating an approximate outline of a portion to be examined, and to display information indicating the cross region on the outline image.

Further features of the present invention will become apparent from the following description of exemplary embodiments (with reference to the attached drawings).

BRIEF DESCRIPTION OF THE DRAWINGS

FIG. 12 is a flowchart showing the processing sequence of the information processing apparatus according to the third embodiment.

DESCRIPTION OF THE EMBODIMENTS

Various exemplary embodiments, features, and aspects of the invention will be described in detail below with reference to the drawings.

First Embodiment

An information processing system according to this embodiment sets, as a processing-target region, a region (existence region) where a corresponding region (corresponding lesion area) corresponding to an ROI (Region Of Interest) (for example, a lesion area of interest) in three-dimensional image data (reference image) may be located. Then, the system calculates a cross region between the calculated three-dimensional existence region and an ultrasonic tomographic image (target image) which is captured in real time (that is, works out what portion of the three-dimensional volume from which the three-dimensional image data has been taken should be displayed as the target image in order for a section of the 3D existence region to be included in what is displayed), and projects and displays the calculated cross region (the determined portion) onto an outline image (to be referred to as "body mark" hereinafter), which represents an approximate outline of a portion to be examined, together with the existence region. Thus, when the user (doctor or operator) searches for the corresponding region on the ultrasonic tomographic image, he or she can easily recognize the location of the currently displayed ultrasonic tomographic image in the three-dimensional existence region based on the information displayed on the body mark. As a result, the operator can easily recognize the proportion of the remaining existence region to be searched, and can efficiently search for and identify the corresponding lesion area. The information processing system according to this embodiment will be described below.

Figure 1:
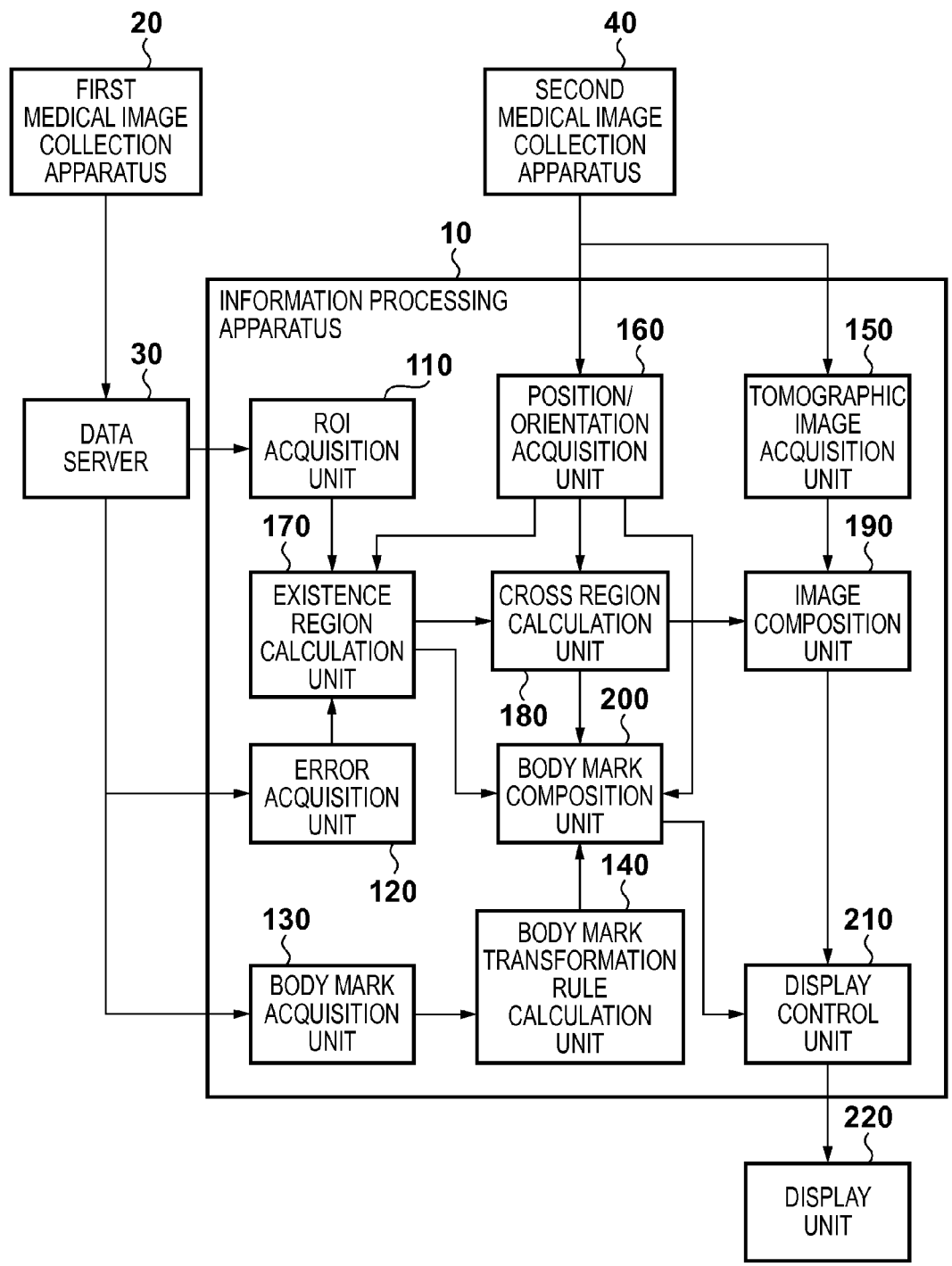
FIG. 1 is a block diagram showing the arrangement of an information processing apparatus according to the first embodiment.

FIG. 1 shows the arrangement of the information processing system according to this embodiment. As shown in FIG. 1, an information processing apparatus 10 according to this embodiment includes an ROI acquisition unit 110, error acquisition unit 120, body mark acquisition unit 130, body mark transformation rule calculation unit 140, and tomographic image acquisition unit 150. The information processing apparatus 10 further includes a position/orientation acquisition unit 160, existence region calculation unit (to be also referred to as a processing-target region acquisition unit hereinafter) 170, cross region calculation unit 180, image composition unit 190, body mark composition unit 200, display control unit 210, and display unit 220. The information processing apparatus 10 is connected to a data server 30 which holds three-dimensional image data collected from a first medical image collection apparatus 20, error factor information (to be described later), and the like. Also, the information processing apparatus 10 is connected to an ultrasonic imaging apparatus as a second medical image collection apparatus 40 which captures an ultrasonic tomographic image of an object.

Figure 2:
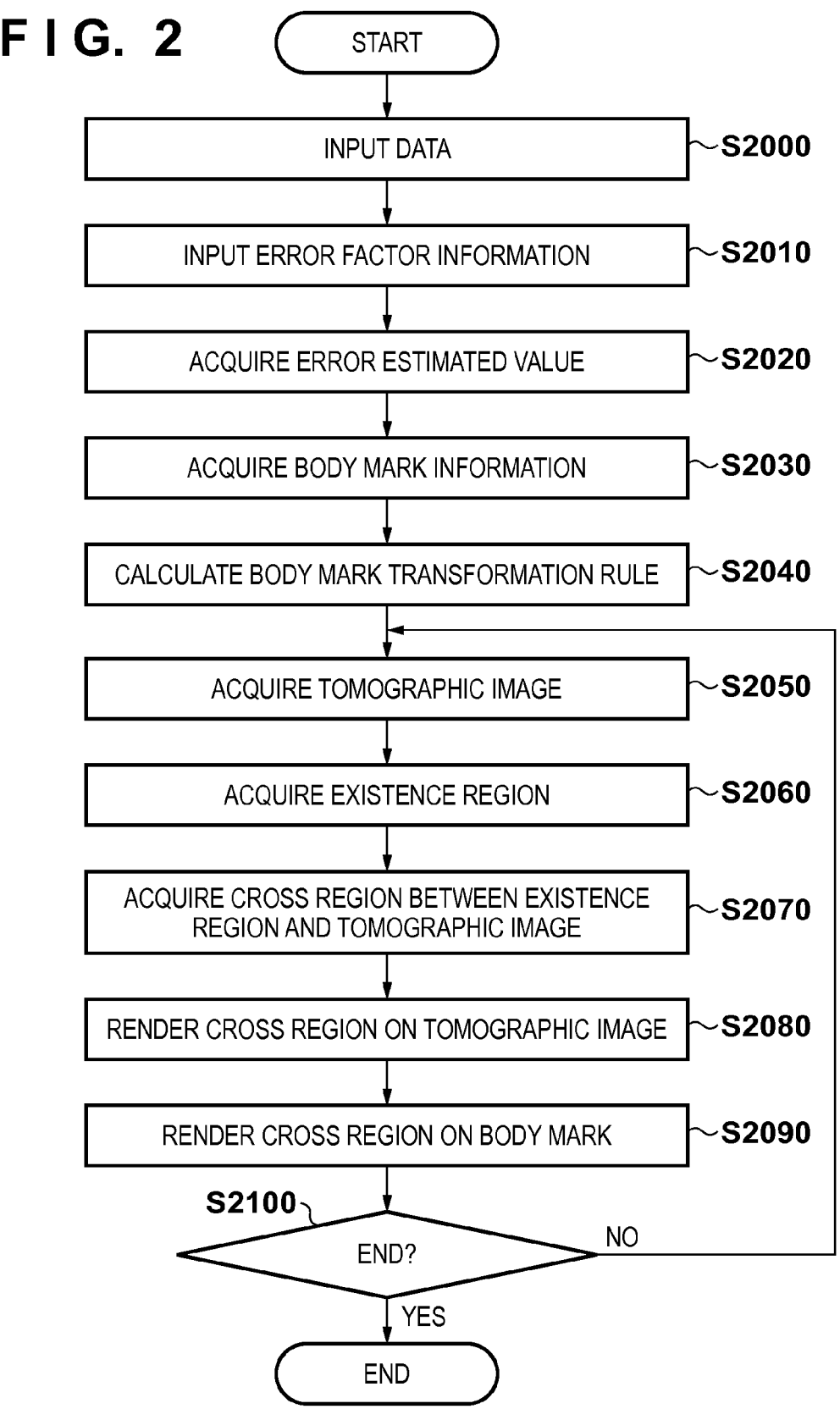
FIG. 2 is a flowchart showing the processing sequence of the information processing apparatus according to the first embodiment.

The operations of the respective units and the processing sequence of the information processing apparatus 10 according to this embodiment will be described below with reference to the flowchart shown in FIG. 2.

(Step S2000: Input Data)

In step S2000, the ROI acquisition unit 110 acquires information indicating an ROI from the data server 30, and outputs the ROI to the existence region calculation unit 170. In this case, the information indicating the ROI includes, for example, coordinates of a position of a lesion area of interest (position of the center of gravity of the area) and those of points located at a region boundary of the lesion area of interest in an MRI image as three-dimensional image data. In the description, assume that the information indicating the ROI is expressed by an MRI apparatus coordinate system.

(Step S2010: Input Error Factor Information)

In step S2010, the error acquisition unit 120 acquires various kinds of error factor information used to calculate an error estimated value from the data server 30. In this case, the error factor information is that used to calculate an existence region of a corresponding region on an ultrasonic tomographic image. For example, information indicating a type of a position/orientation sensor (for example, sensor A, sensor B, or the like) used to measure the position and orientation of an ultrasonic probe is acquired as error factor information from the data server 30.

(Step S2020: Acquire Error Estimated Value)

In step S2020, the error acquisition unit 120 calculates an error estimated value based on various kinds of error factor information (various data used to calculate an error) acquired in step S2010, and outputs the calculated value to the existence region calculation unit 170.

Processing for calculating an error estimated value can be executed based on, for example, the characteristics of a position/orientation sensor used to measure the position and orientation of the ultrasonic probe of the second medical image collection apparatus 40. A reference value of an error is set in advance for each measurement method of the position/orientation sensor, and a value is selectable according to the measurement method of the sensor used. For example, when the error factor information input in step S2010 is that indicating that sensor A as an optical sensor is used, an error estimated value can be calculated as a value smaller than that when sensor B as a magnetic sensor is used. Note that the processing for estimating an error may be replaced by another processing.

(Step S2030: Acquire Body Mark Information)

In step S2030, the body mark acquisition unit 130 acquires a body mark which represents an approximate outline of a breast as a portion to be examined from the data server 30.

Figure 3:
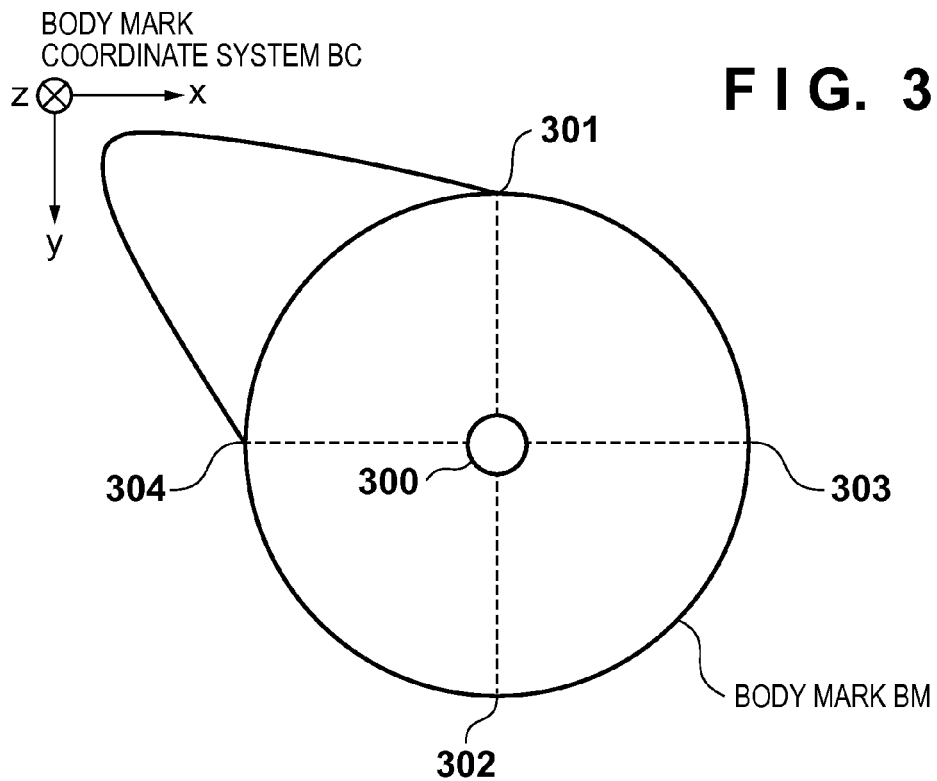
FIG. 3 shows a body mark of a breast.

FIG. 3 shows the body mark of the breast. Referring to FIG. 3, reference symbol BM denotes a body mark of a right breast. In this embodiment, assume that a papilla 300, breast upper end 301, breast lower end 302, breast inner end 303, and breast outer end 304 are set as feature points of the body mark BM, as shown in FIG. 3. Then, assume that their positions $X_{Ik}^{Bodymark}$ ($1 \leq IK \leq IN$) are acquired in advance and are appended to the body mark BM. Note that these feature points are expressed on a body mark coordinate system BC (a coordinate system which has a plane including the body mark as an xy-plane, and an axis perpendicular to that plane as a z-axis), and exist only on the xy-plane in this embodiment.

(Step S2040: Calculate Body Mark Transformation Rule)

In step S2040, the body mark transformation rule calculation unit 140 calculates a body mark transformation rule required to transform a breast shape to approximately match the shape of the body mark BM in FIG. 3. More specifically, the body mark transformation rule calculation unit 140 calculates a rule required to transform positions $X_{Ik}^{Supine}$ of feature points of a breast to correspond to the positions $X_{Ik}^{Bodymark}$ of the feature points of the body mark BM by a method disclosed in, for example, Japanese Patent Laid-Open No. 2008-086742. This body mark transformation rule is expressed by a three-dimensional displacement vector group which represents moving amounts of respective points on the breast to corresponding positions on the xy-plane on the body mark coordinate system.

(Step S2050: Acquire Tomographic Image)

In step S2050, the tomographic image acquisition unit 150 acquires an ultrasonic tomographic image from the second medical image collection apparatus 40. Also, the position/orientation acquisition unit 160 acquires measurement values of the position and orientation of the ultrasonic probe at the time of capturing of the ultrasonic tomographic image from the second medical image collection apparatus 40. Then, the position/orientation acquisition unit 160 calculates the position and orientation of the ultrasonic tomographic image on the MRI apparatus coordinate system from the measurement values using calibration data which are stored in advance as known values. The position/orientation acquisition unit 160 outputs the calculated position and orientation to the existence region calculation unit 170, cross region calculation unit 180, and body mark composition unit 200. Note that the ultrasonic imaging apparatus as the second medical image collection apparatus 40 captures an ultrasonic tomographic image of an object in real time. Also, the position and orientation of the ultrasonic probe are measured by a position/orientation sensor (not shown). Assume that the position and orientation of the ultrasonic probe are expressed by those on a reference coordinate system with reference to, for example, an object.

(Step S2060: Acquire Existence Region)

In step S2060, the existence region calculation unit 170 calculates an existence region of a corresponding region on an ultrasonic coordinate system, and outputs it to the cross region calculation unit 180 and body mark composition unit 200. In this case, the ultrasonic coordinate system is a three-dimensional coordinate system with reference to an ultrasonic tomographic image, and can be defined as a coordinate system which has one point on the tomographic image as an origin, sets x- and y-axes on a plane of the tomographic image, and sets a z-axis in a direction perpendicular to the plane.

More specifically, the existence region calculation unit 170 estimates a corresponding region of the ROI on the ultrasonic coordinate system first. For example, when the position of the lesion area of interest is given as the information indicating the ROI, the existence region calculation unit 170 estimates a position of a corresponding lesion area on the ultrasonic coordinate system as information indicating a corresponding region. This estimation can be done based on the position and orientation of the ultrasonic tomographic image on the MRI apparatus coordinate system, which are calculated in step S2050.

Next, the existence region calculation unit 170 calculates a three-dimensional existence region of the corresponding region on the ultrasonic coordinate system based on the estimated corresponding region and the error estimated value acquired in step S2020. For example, the existence region calculation unit 170 calculates the existence region as a sphere which has the position of the estimated corresponding lesion area as the center, and the error estimated value as a radius.

(Step S2070: Calculate Cross Region Between Existence Region and Tomographic Image)

In step S2070, the cross region calculation unit 180 calculates a cross region between the existence region as a processing-target region of this embodiment, and the tomographic image using the information of the existence region and the information of the position and orientation of the ultrasonic tomographic image. Then, the cross region calculation unit 180 outputs the calculated cross region to the image composition unit 190 and body mark composition unit 200. When the existence region is a sphere, the cross region is defined as a circle as a region (section of the sphere) where the sphere and tomographic image cross each other. Therefore, the cross region calculation unit 180 calculates a central position and radius of this circle as the cross region. Note that since the calculation method of a cross region between a sphere and plane defined on a three-dimensional space is a state-of-the-art method, a description thereof will not be given. Note that in a case where the sphere and tomographic image do not cross, information indicating "no existence region on section" is stored.

(Step S2080: Render Cross Region on Tomographic Image)

In step S2080, the image composition unit 190 generates an image by superimposing the cross region on the ultrasonic tomographic image using the central position and radius of the circle acquired from the cross region calculation unit 180, and outputs that image to the display control unit 210. However, if "no existence region on section" is determined in step S2070, the image composition unit 190 outputs the ultrasonic tomographic image intact to the display control unit 210. Then, the display control unit 210 displays the acquired image on the display unit 220. Also, this image is externally output via an I/F (not shown), is transformed into a state usable for another application, and is stored on a RAM (not shown), as needed.

Figure 4:
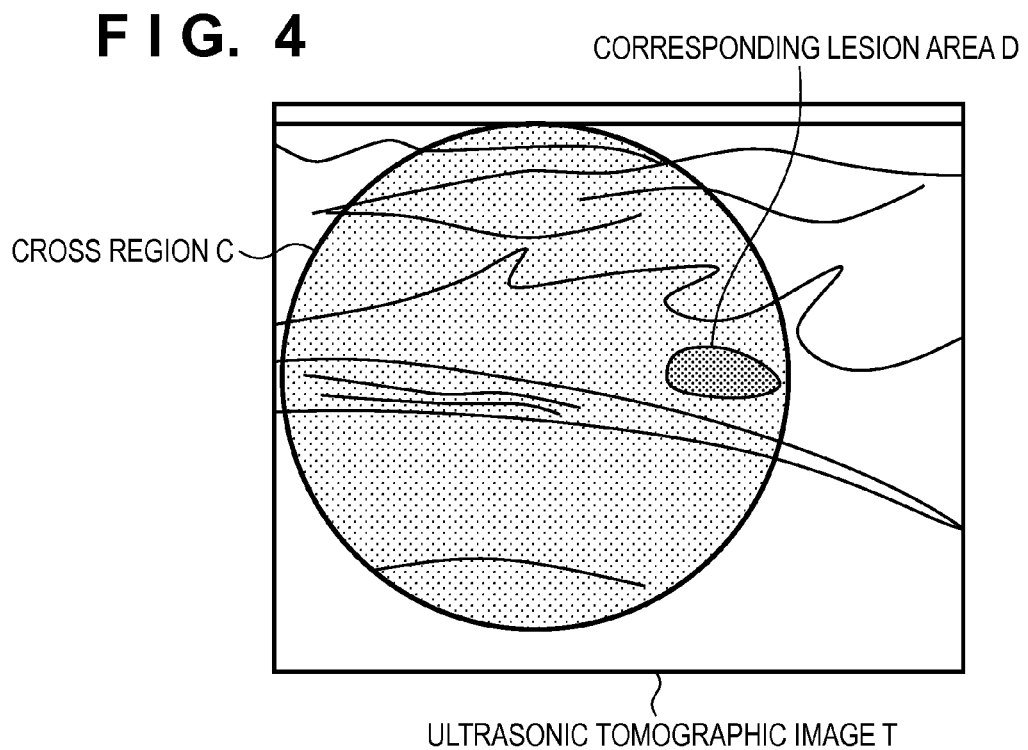
FIG. 4 shows an ultrasonic tomographic image on which a cross region is superimposed according to the first embodiment.

FIG. 4 shows the ultrasonic tomographic image on which the cross region is superimposed. Referring to FIG. 4, reference symbol T denotes an ultrasonic tomographic image; D, a corresponding lesion area; and C, a cross region. At this time, the cross region C represents a two-dimensional existence region of the corresponding lesion area on the ultrasonic tomographic image T. As can be seen from FIG. 4, the corresponding lesion area D exists within the cross region C.

(Step S2090: Render Acquired Region on Body Mark)

In step S2090, the body mark composition unit 200 transforms the position/orientation information of the ultrasonic tomographic image calculated in step S2050, the information of the existence region calculated in step S2060, and the information of the cross region calculated in step S2070 onto the body mark coordinate system. Then, the body mark composition unit 200 generates a display object (to be referred to as a composite body mark hereinafter) by superimposing the pieces of transformed information on the body mark acquired in step S2030, and outputs the composite body mark to the display control unit 210. Finally, the display control unit 210 displays the acquired image on the display unit 220. A practical method until the composite body mark is generated will be described below.

In this embodiment, a line segment region of the upper end of the ultrasonic tomographic image, that is, a probe position where the ultrasonic probe contacts a body surface, is acquired from the position/orientation information of the ultrasonic tomographic image. Next, the position of the center of gravity of the cross region (central point of a circular region) on the ultrasonic tomographic image is acquired. Then, a line segment, which passes through the center of gravity of the cross region, extends parallel to the abscissa of the ultrasonic tomographic image, and has a boundary of the cross region as two end points, is calculated.

Figure 5:
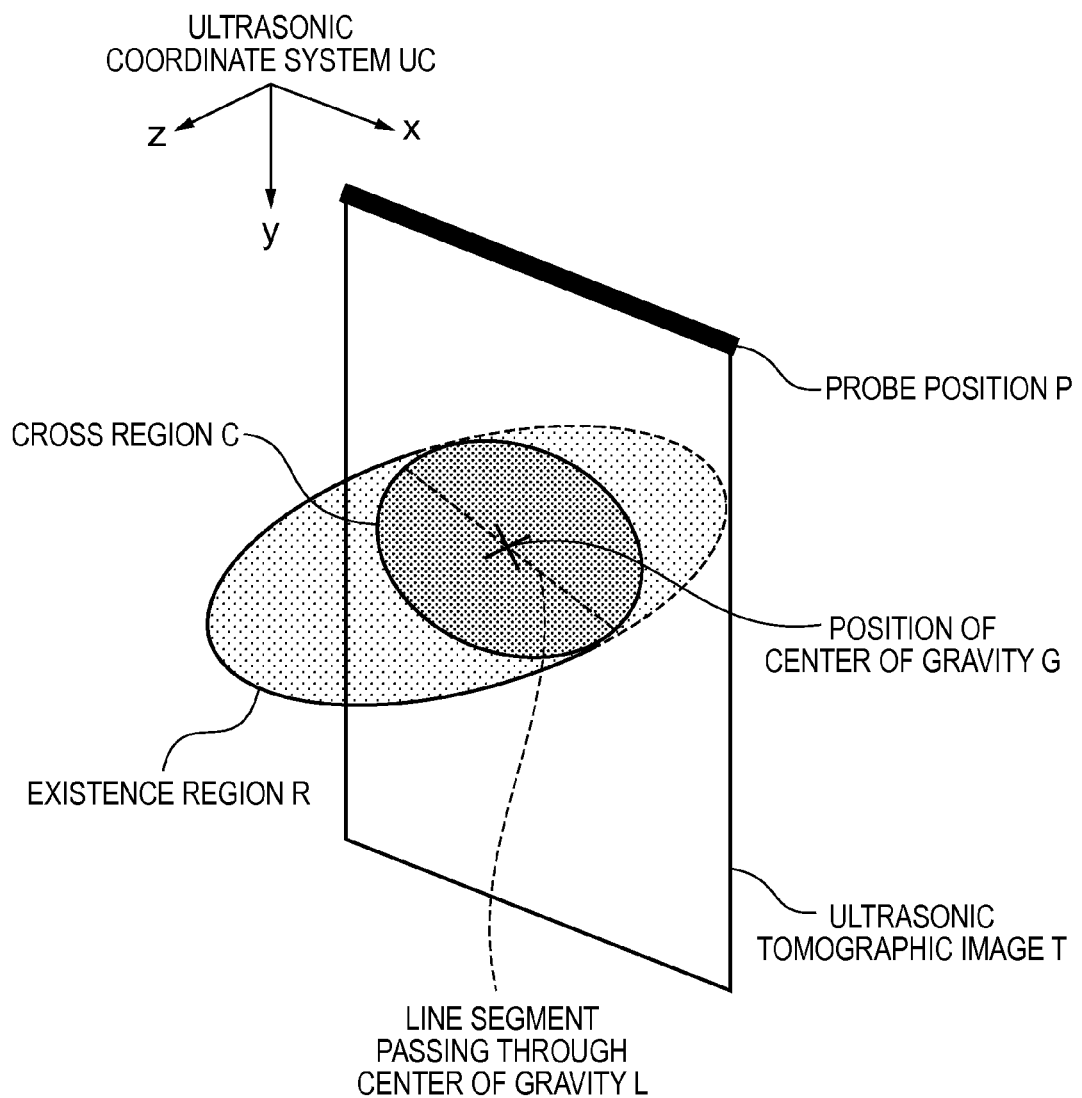
FIG. 5 shows an existence region, ultrasonic tomographic image, and their cross region according to the first embodiment.

FIG. 5 shows the ultrasonic tomographic image, existence region, and their cross region on the ultrasonic coordinate system. Referring to FIG. 5, reference symbol UC denotes xyz axes of the ultrasonic coordinate system; T, an ultrasonic tomographic image; P, a probe position; R, an existence region; C, a cross region; G a position of the center of gravity of the cross region; and L, a line segment which passes through the center of gravity of the cross region.

Next, the probe position P, existence region R, line segment L, and the position G of the center of gravity are respectively transformed from the ultrasonic coordinate system UC shown in FIG. 5 into body mark coordinate system BC shown in FIG. 3 based on the body mark transformation rule calculated in step S2040. By superimposing the pieces of transformed region information on the body mark, a composite body mark is obtained.

Figure 6A:
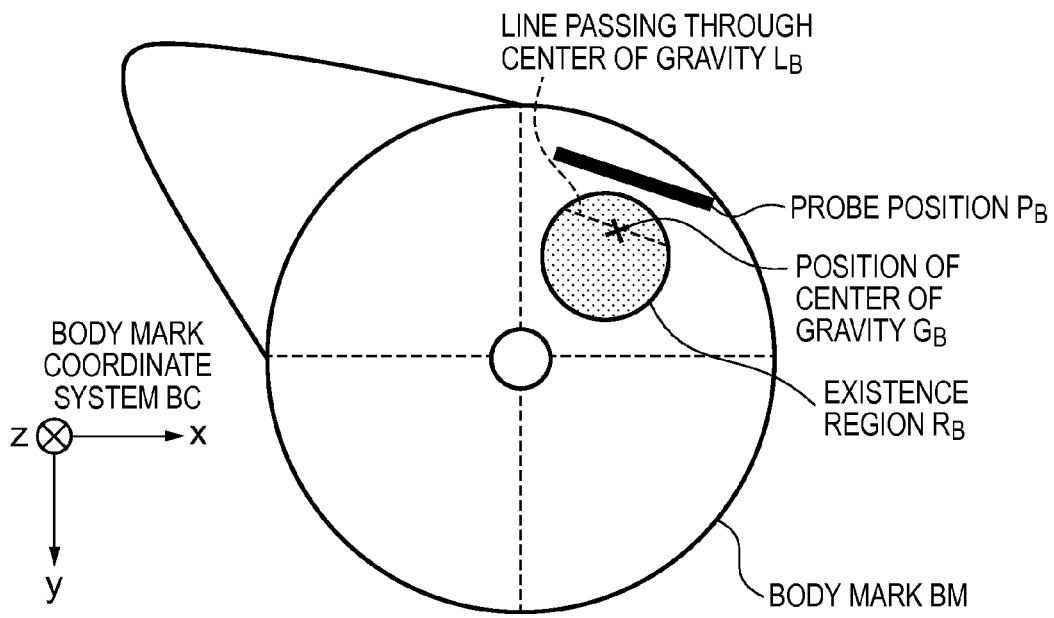
FIGS. 6A and 6B show a composite body mark of a breast according to the first embodiment.
Figure 6B:
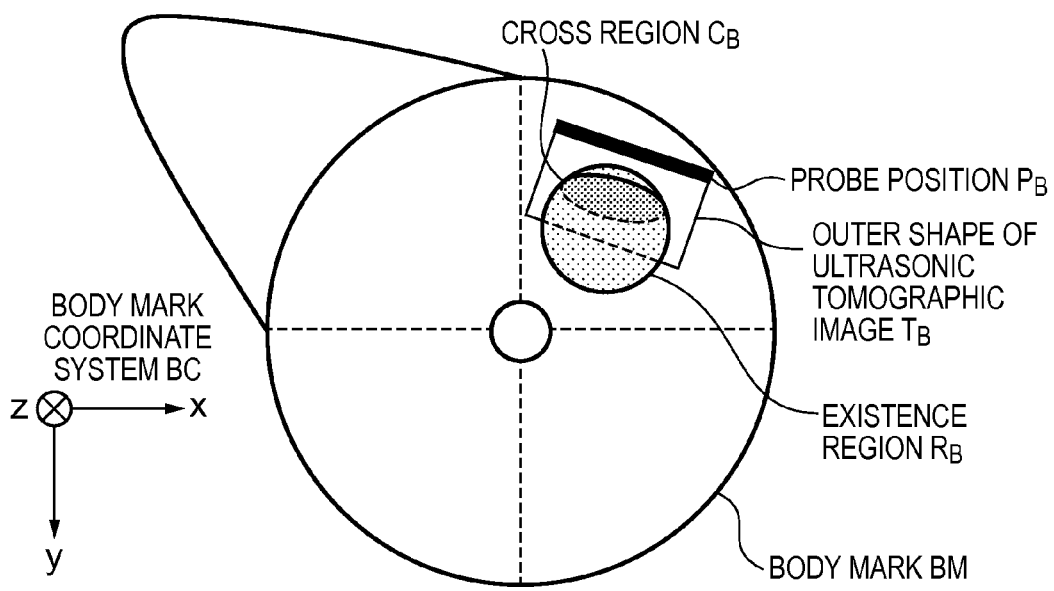

FIGS. 6A and 6B show the composite body mark. Referring to FIG. 6A, reference symbols BM and BC denote the same components as those in FIG. 3. Reference symbol $P_B$ denotes a transformed probe position; $R_B$, a transformed existence region; $G_B$, a transformed position of the center of gravity of the cross region; and $L_B$, a transformed line segment which passes through the center of gravity of the cross region. As can be seen from FIG. 6A, when the user observes the body mark, he or she can recognize the positional relationship between the contact position of the ultrasonic probe on the body surface and the existence region. Furthermore, the cross region of the ultrasonic tomographic image on the existence region can be easily recognized.

The composite body mark generation method is not limited to this method. For example, the cross region C itself may be transformed onto the body mark coordinate system and may be superimposed in place of the line segment L. In order to allow the user to easily recognize the position and orientation of the cross region on the ultrasonic tomographic image, an outer shape of the ultrasonic tomographic image T may also be transformed and superimposed. In place of the outer shape, the ultrasonic tomographic image T itself may be transformed and superimposed.

Referring to FIG. 6B, reference symbols $P_B$ and $R_B$ denote the same components as those in FIG. 6A. Reference symbol $C_B$ denotes a transformed cross region; and $T_B$, a transformed outer shape of the ultrasonic tomographic image. As can be seen from FIG. 6B, when the user observes the body mark, he or she can easily recognize a cross position of the ultrasonic tomographic image on the existence region and a tilt of the ultrasonic tomographic image.

(Step S2100: Determine Whether or Not to End Overall Processing)

The information processing apparatus 10 determines in step S2100 whether or not to end the overall processing. For example, the information processing apparatus 10 acquires an end instruction which is input by the operator by pressing a predetermined key (end key) on a keyboard (not shown). If it is determined that the overall processing is to end, the information processing apparatus 10 ends the overall processing. On the other hand, if it is determined that the overall processing is not to end, the process returns to step S2050, and the information processing apparatus 10 executes the processes in step S2050 and subsequent steps again for a new ultrasonic tomographic image to be captured.

As described above, the information processing apparatus according to this embodiment displays the cross region between the currently displayed and existence region of the corresponding lesion area as the processing-target region on the body mark. Also, the apparatus displays information of the existence region and probe position on the body mark together with the cross region. Thus, the user can easily recognize the current position of the ultrasonic tomographic image with respect to the existence region. Therefore, the operator can easily recognize a degree of the remaining existence region to be searched, and can efficiently search for and identify the corresponding lesion area.

Second Embodiment

The information processing system according to the first embodiment has as its object to present a search range of the corresponding lesion area when it is not presumed that the estimated position of the corresponding lesion area (to be referred to as an estimated lesion position hereinafter) is accurate. By contrast, an information processing system according to this embodiment is based on an assumption that it is presumed that the estimated lesion position is accurate. Then, under this assumption, the system of this embodiment aims at making a display required to navigate a probe operation to the estimated lesion position. That is, the system of this embodiment has as its object to provide information which helps the user to recognize the positional relationship between the ultrasonic tomographic image and estimated lesion position. More specifically, this embodiment displays, on a body mark, a guide graphic which allows an ultrasonic tomographic image to include the estimated lesion position when the user operates a probe so that the guide graphic matches the estimated lesion position. For this purpose, this embodiment defines a processing-target region as a plane region (flush plane region) which includes the estimated lesion position in the same plane and has the same depth as the estimated lesion position. Then, a cross region (and note that the "cross regions" are sometimes referred to as "cross sections" herein) between the flush plane region and an ultrasonic section is calculated, and a guide graphic indicating the cross region is displayed on the body mark together with the estimated lesion position. Since the user can always recognize the guide graphic indicating a position on the ultrasonic tomographic image having the same depth as the estimated lesion position on the body mark, he or she can accurately recognize a moving distance of the ultrasonic probe required to reach the estimated lesion position.

Figure 7:
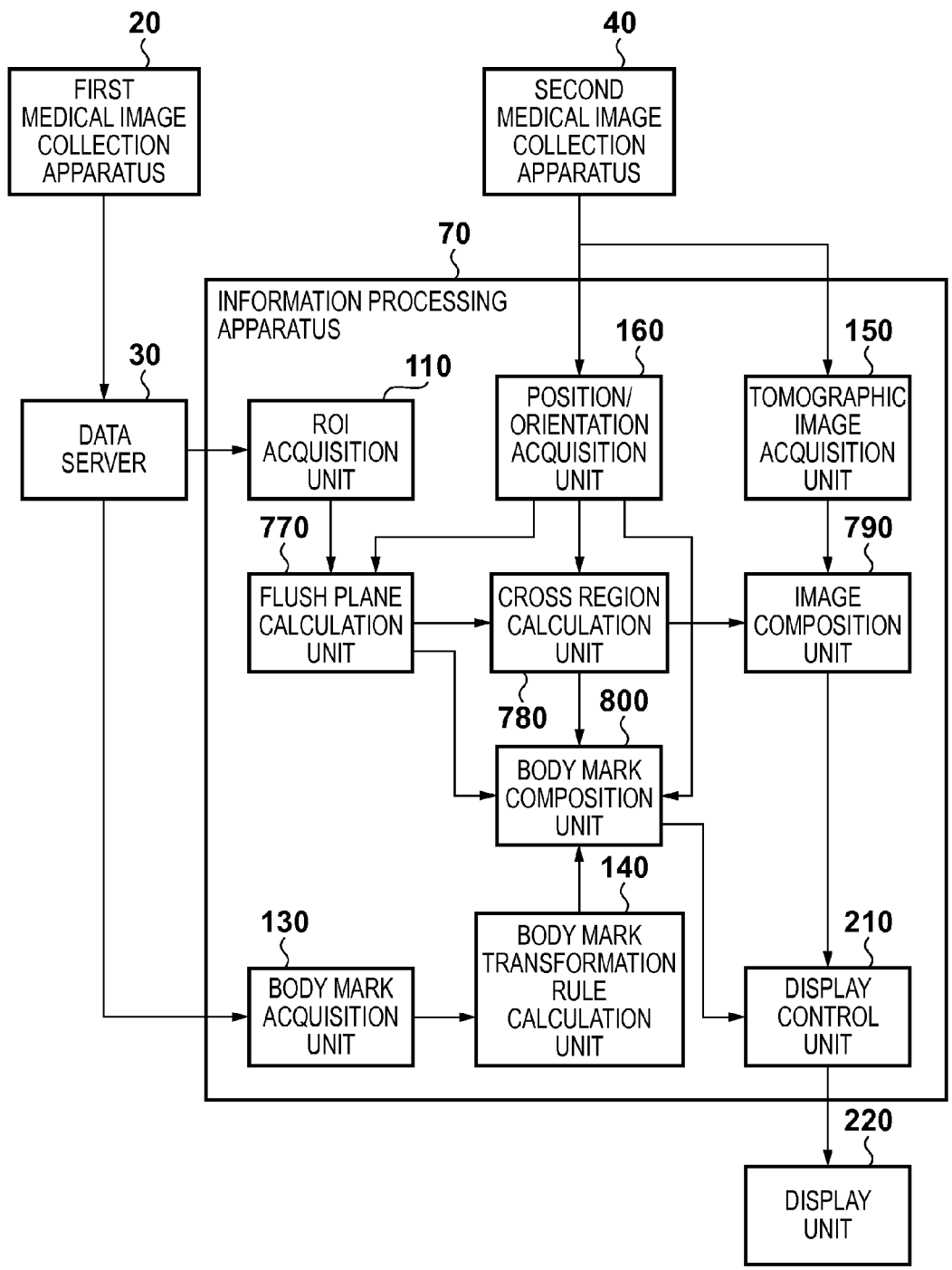
FIG. 7 is a block diagram showing the arrangement of an information processing apparatus according to the second embodiment.

FIG. 7 shows the arrangement of an information processing system according to this embodiment. As shown in FIG. 7, an information processing apparatus 70 according to this embodiment includes an ROI acquisition unit 110, body mark acquisition unit 130, body mark transformation rule calculation unit 140, and tomographic image acquisition unit 150. The information processing apparatus 70 further includes a position/orientation acquisition unit 160, flush plane calculation unit (to be also referred to as a processing-target region acquisition unit hereinafter) 770, cross region calculation unit 780, image composition unit 790, body mark composition unit 800, display control unit 210, and display unit 220. Then, the information processing apparatus 70 is connected to a data server 30 which holds three-dimensional image data, a body mark (to be described later), and the like. The information processing apparatus 70 is also connected to an ultrasonic imaging apparatus as a second medical image collection apparatus 40 which captures an ultrasonic tomographic image of an object.

Figure 8:
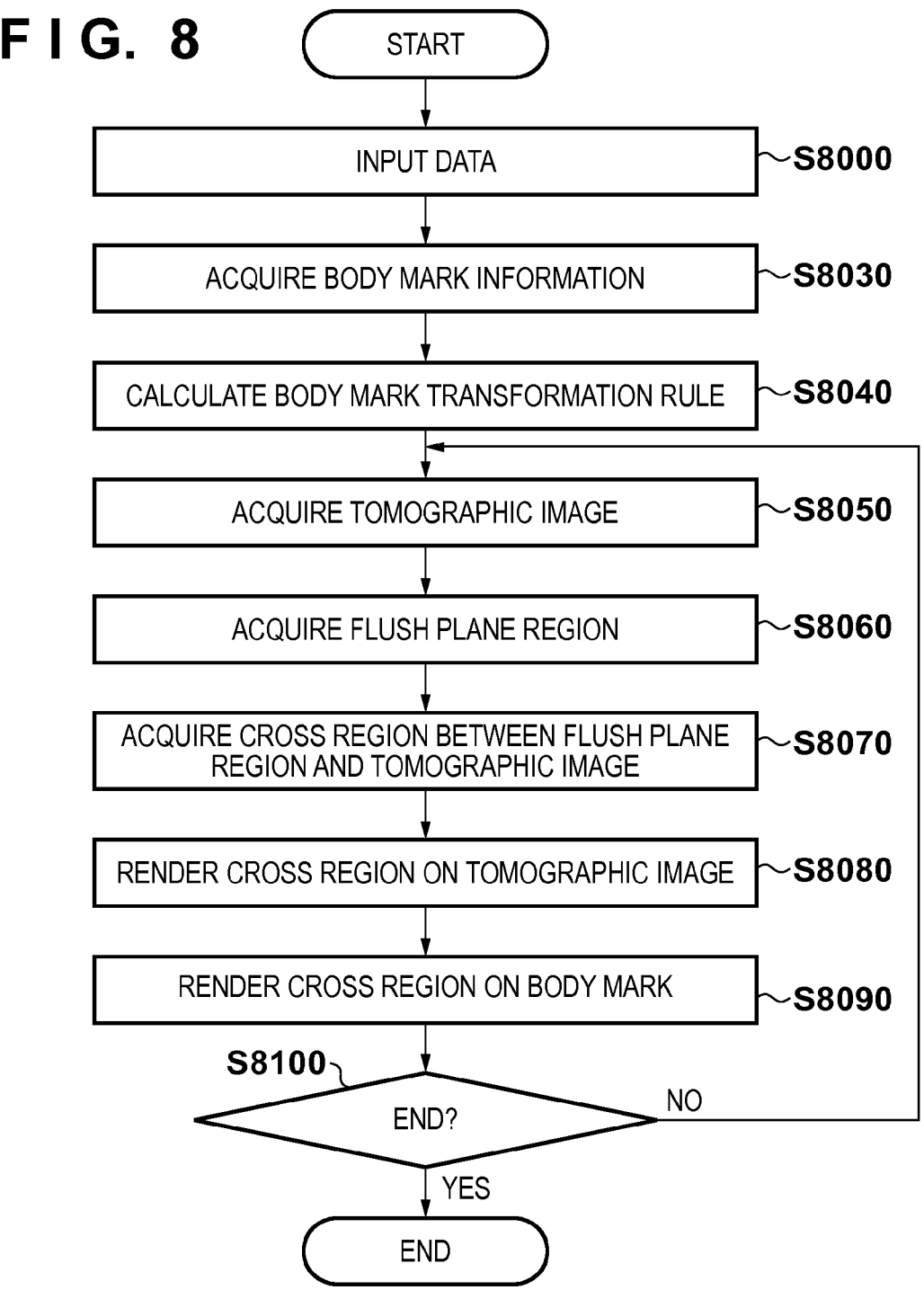
FIG. 8 is a flowchart showing the processing sequence of the information processing apparatus according to the second embodiment.

The operations of the respective units and processing sequence of the information processing apparatus 70 according to this embodiment will be described below with reference to the flowchart shown in FIG. 8. However, since processes of steps S8000, S8030, S8040, S8050, and S8100 are the same as those of steps S2000, S2030, S2040, S2050, and S2100 in the flowchart shown in FIG. 2, a description thereof will not be repeated.

(Step S8060: Acquire Flush Plane Region)

In step S8060, the flush plane calculation unit 770 calculates a flush plane region (to be described later) as a processing-target region, and outputs it to the cross region calculation unit 780 and body mark composition unit 800. Furthermore, the flush plane calculation unit 770 outputs position information of a corresponding lesion area (estimated lesion position) on an ultrasonic coordinate system, which is estimated during the flush plane acquisition process to the body mark composition unit 800. In this case, the ultrasonic coordinate system indicates the same as that in the first embodiment.

More specifically, the flush plane calculation unit 770 estimates a position of the corresponding lesion area on the ultrasonic coordinate system first. Then, the flush plane calculation unit 770 decides a plane parallel to the front surface of a human body on the ultrasonic coordinate system. This plane can be decided by acquiring a combination of positions of at least three feature points on a body surface, which are obviously arranged on the plane parallel to the front surface of the human body. For example, the plane can be decided by acquiring positions of three or more body surface points close to a sternum. Then, the flush plane calculation unit 770 calculates, as a flush plane region, a plane, which is parallel to the decided plane, and has the same depth as the estimated lesion position in a depth direction when the human body is viewed from the front surface side (to pass through the estimated lesion position). In this embodiment, this flush plane region is defined as an auxiliary region required to guide an ultrasonic tomographic image to a position where the corresponding lesion appears. Note that the flush plane region acquisition method is not limited to this one, and any other methods may be used as long as a plane region which includes the estimated lesion position in a flush plane and has the same depth as the estimated lesion position can be acquired. For example, letting Py be a y coordinate (a coordinate in the depth direction) of the estimated lesion position on the ultrasonic coordinate system, a plane defined by y=Py may be acquired as the flush plane region.

(Step S8070: Calculate Cross Region Between Existence Region and Tomographic Image)

In step S8070, the cross region calculation unit 780 calculates a cross region between the flush plane region as the processing-target region of this embodiment and the tomographic image using the information of the flush plane region and the information of the position and orientation of the ultrasonic tomographic image. Then, the cross region calculation unit 780 outputs the cross region to the image composition unit 790 and body mark composition unit 800. In this embodiment, since the flush plane region is defined as a plane region, the cross region is defined as a line segment region as a region where that plane (a plane having an infinite region) crosses the tomographic image (a plane having a finite region). Therefore, the cross region calculation unit 780 calculates two end positions of this line segment region on the ultrasonic tomographic image as a cross region. Note that since the calculation method of a cross region between planes defined on a three-dimensional space is a state-of-the-art method, a description thereof will not be given. Note that when it is determined that flush plane region and tomographic image do not cross, a line of intersection between the flush plane region and a plane region which is obtained by infinitely extending the ultrasonic tomographic image in a positive direction of the y-axis (depth direction) on the ultrasonic coordinate system is calculated as a cross region.

Figure 9:
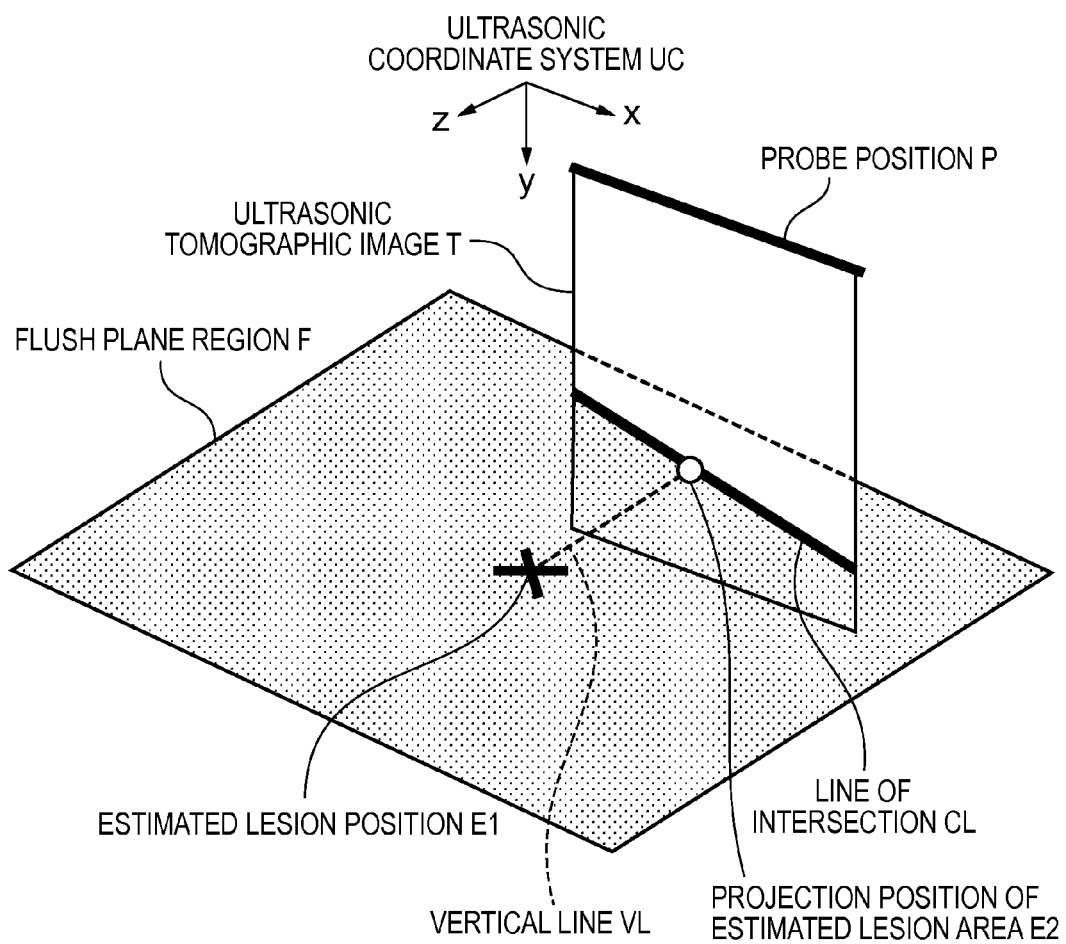
FIG. 9 shows an existence region, ultrasonic tomographic image, and their cross region according to the second embodiment.

FIG. 9 shows the flush plane region, ultrasonic tomographic image, and their cross region. Referring to FIG. 9, reference symbols UC, T, and P denote the same components as those in FIG. 5. In FIG. 9, reference symbol E1 denotes an estimated lesion position; F, a flush plane region; CL, a line segment as a line of intersection between the ultrasonic tomographic image T and flush plane region F. Also, reference symbol VL denotes a vertical line drawing from the estimated lesion position E1 to the line segment CL; and E2, an intersection between the line segment CL and vertical line VL, that is, a projection position of the estimated lesion position E1 (to be referred to as a projection position of the estimated region area hereinafter) onto the line of intersection CL. In this embodiment, assume that the projection position E2 of the estimated lesion area is also calculated to include information of the cross region. Note that when the length of the vertical line VL is smaller than a predetermined value, it is judged that the estimated lesion position E1 is included in the ultrasonic tomographic image T, and its information is stored.

(Step S8080: Render Cross Region on Tomographic Image)

In step S8080, the image composition unit 790 generates an image by superimposing the cross region on the ultrasonic tomographic image using the two end positions of the line segment region and the projection position of the estimated lesion area acquired from the cross region calculation unit 780, and outputs the image to the display control unit 210. Note that when it is judged in step S8070 that the estimated lesion position is included on the tomographic image (in this case, that position matches the projection position of the estimated lesion area), the display unit 210 can change a display mode (for example, change a color) of the projection position of the estimated lesion area so that the user can recognize it. However, when it is determined in step S8070 that flush plane region and ultrasonic tomographic image do not cross, the ultrasonic tomographic image is output intact to the display control unit 210. Then, the display control unit 210 displays the acquired image on the display unit 220. Also, this image is externally output via an I/F (not shown), is transformed into a state usable for another application, and is stored on a RAM (not shown), as needed.

Figure 10:
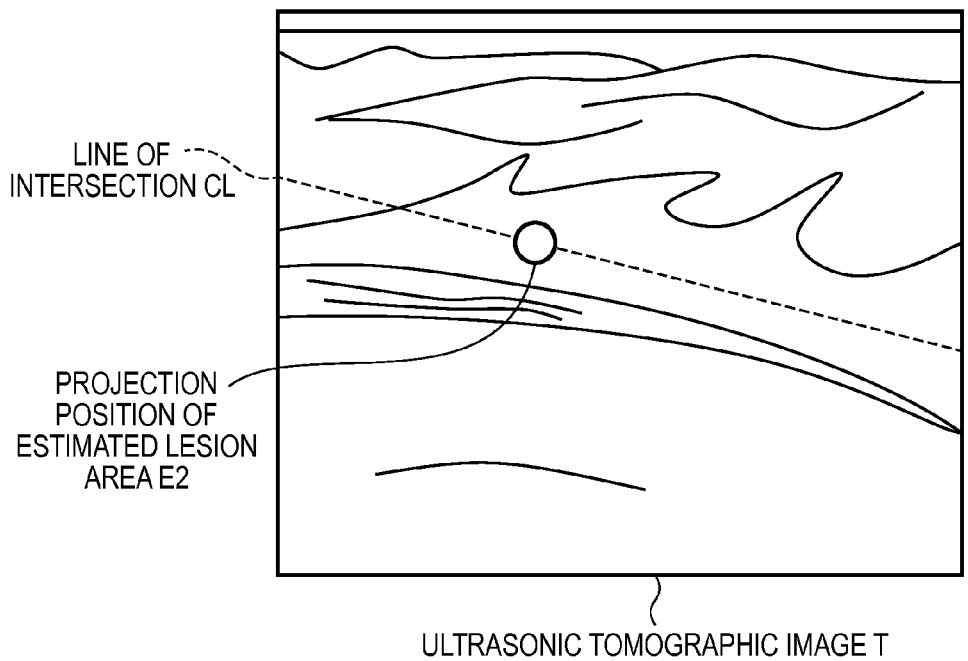
FIG. 10 shows an ultrasonic tomographic image on which a cross region is superimposed according to the first embodiment.

FIG. 10 shows the ultrasonic tomographic image on which the cross region is superimposed. Referring to FIG. 10, reference symbols T, CL, and E2 denote the same components as those in FIG. 9. In FIG. 10, by referring to the line of intersection CL between the flush plane region and ultrasonic tomographic image T, the user can recognize a depth of the estimated lesion position from the body surface. At the same time, the user can recognize a tilt of the ultrasonic tomographic image T with respect to the plane parallel to the front surface of the human body. Furthermore, by referring to the projection position E2 of the estimated lesion area, the user can recognize an appearance position of the corresponding lesion area by translating the ultrasonic tomographic image in the back-and-forth direction to be parallel to the front surface of the human body while the orientation of the ultrasonic probe is fixed.

(Step S8090: Render Acquired Region on Body Mark)

In step S8090, the body mark composition unit 800 transforms the following pieces of information onto a body mark coordinate system:

position/orientation information of the ultrasonic tomographic image calculated in step S8050;

information of the estimated lesion position estimated in step S8060; and information of the cross region calculated in step S8070.

Then, the body mark composition unit 800 generates a display object (to be referred to as a "composite body mark" hereinafter) by superimposing the pieces of transformed information onto a body mark acquired in step S8030, and outputs it to the display control unit 210. Finally, the display control unit 210 displays the acquired image on the display unit 220. A practical method until the composite body mark is generated will be described below.

In this embodiment, the probe position P and an outer shape of the ultrasonic tomographic image T in FIG. 9 are transformed from the ultrasonic coordinate system UC in FIG. 9 into a body mark coordinate system BC in FIG. 3 based on a body mark transformation rule calculated in step S8040. Likewise, the regions of the estimated lesion position E1, line of intersection CL, and projection position E2 of the estimated lesion area are transformed from the ultrasonic coordinate system UC into the body mark coordinate system BC. Then, a composite body mark is obtained by superimposing the pieces of transformed region information on the body mark. At this time, in place of the outer shape of the ultrasonic tomographic image T, the ultrasonic tomographic image T itself (a transformation result thereof) may be superimposed on the body mark.

Figure 11:
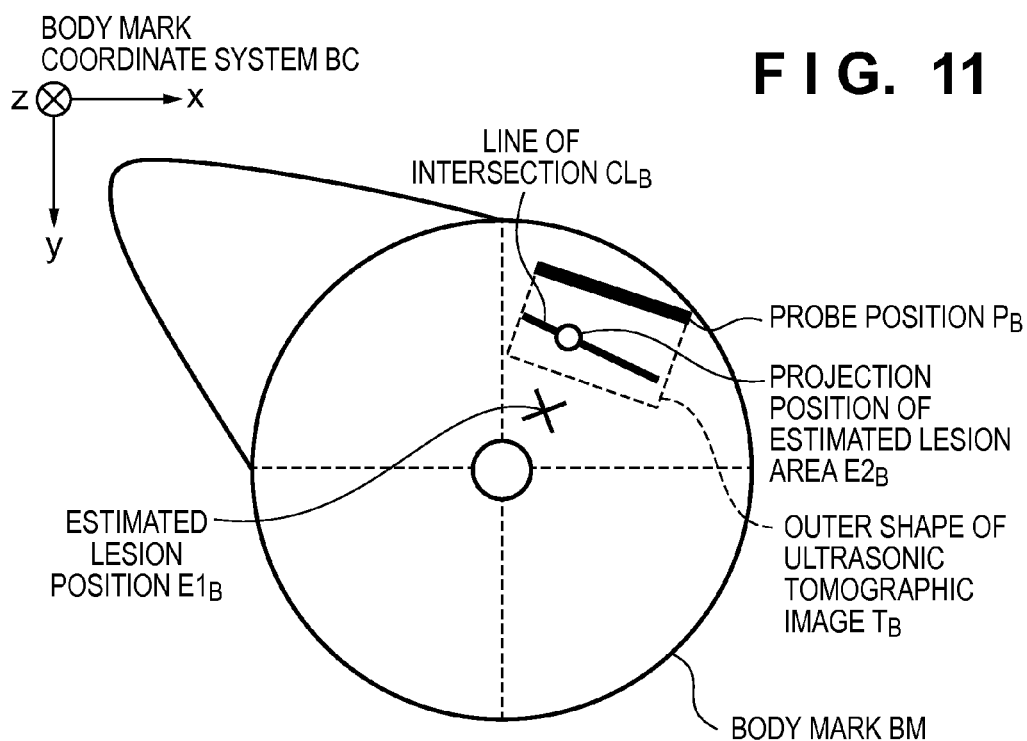
FIG. 11 shows a composite body mark of a breast according to the second embodiment.

FIG. 11 shows the composite body mark. Referring to FIG. 11, reference symbols BM, BC, $P_B$, and $T_B$ denote the same components as those in FIGS. 6A and 6B. Reference symbol $E1_B$ denotes a transformed estimated lesion position; $CL_B$, a transformed line of intersection; and $E2_B$, a transformed projection position of the estimated lesion area. From the positional relationship between $P_B$ and $E1_B$, when the user observes the body mark, he or she can recognize the positional relationship between the contact position of the ultrasonic probe on the body surface and the estimated lesion position. Furthermore, from the positional relationship between $CL_B$ and $E1_B$, the user can recognize a distance of a corresponding position of the ultrasonic tomographic image from the estimated lesion position on a plane having the same depths as the estimated lesion position when viewed from the front surface direction of the human body (that is, when viewed in the depth direction of the body mark). That is, the user can recognize a distance required to reach the estimated lesion position when he or she translates the probe to be parallel to the body mark lane while fixing the orientation of the ultrasonic probe. When the user moves the probe so that E1$_B$ and E2$_B$ overlap each other, the corresponding lesion position can appear on the ultrasonic tomographic image in FIG. 11.

As described above, since the information processing apparatus according to this embodiment displays the corresponding position on the ultrasonic tomographic image having the same depth as the estimated lesion position on the body mark together with the estimated lesion position, the user can easily recognize the current position of the ultrasonic tomographic image with respect to the estimated lesion position. Therefore, the user can accurately recognize a moving distance of the position of the ultrasonic tomographic image required to reach the estimated lesion position.

Third Embodiment

In the first embodiment, the cross region (to be referred to as a first cross region hereinafter) between the existence region (to be referred to as a first processing-target region hereinafter) defined as a region where the corresponding lesion area can exist and the ultrasonic tomographic image is displayed on the body mark. On the other hand, in the second embodiment, the cross region (to be referred to as a second cross region hereinafter) between the flush plane region (to be referred to as a second processing-target region hereinafter) defined as a plane region having the same depth as the estimated position of the corresponding lesion area and the ultrasonic tomographic image is displayed on the body mark. An information processing system according to this embodiment switches to display, on the body mark, the first cross region when the ultrasonic tomographic image crosses the first processing-target region, or the second cross region when they do not cross. The arrangement of the information processing system according to this embodiment is the same as that shown in FIG. 1, but only some processes of a flush plane calculation unit 770, cross region calculation unit 180, image composition unit 190, and body mark composition unit 200 are different from the first embodiment. Only differences from the first embodiment in the information processing system according to this embodiment will be described below.

The operations of the respective units and the processing sequence of an information processing apparatus 80 according to this embodiment will be described below with reference to the flowchart shown in FIG. 12. However, processes of steps S12000, S12010, and S12020 are the same as those of steps S2000, S2010, and S2020 shown in FIG. 2. Also, processes of steps S12030, S12040, S12050, and S12100 are the same as those of steps S2030, S2040, S2050, and S2100 in FIG. 2. For this reason, a description of these processes will not be repeated.

(Step S12060: Acquire First and Second Processing-Target Regions)

In step S12060, the existence region calculation unit 170 calculates an existence region (first processing-target region) of a corresponding region on the ultrasonic coordinate system by the same method as in step S2060 in the first embodiment. Also, the existence region calculation unit 170 calculates a flush plane region (second processing-target region) of the corresponding region on the ultrasonic coordinate system by the same method as in step S8060 in the second embodiment.

(Step S12070: Determine Cross Between Existence Region and Tomographic Image)

The cross region calculation unit 180 determines in step S12070 based on the information of the existence region calculated in step S12060 and information of the position and orientation of the ultrasonic tomographic image calculated in step S12050 whether or not the ultrasonic tomographic image crosses the existence region. If it is determined that they cross, the process advances to step S12080; otherwise, the process advances to step S12090.

(Step S12080: Acquire and Render First Cross Region)

In step S12080, the cross region calculation unit 180 acquires a first cross region, and outputs it to the image composition unit 190 and body mark composition unit 200. Then, the image composition unit 190 generates a first composite image by superimposing the information of the acquired first cross region on the ultrasonic tomographic image, and the display control unit 210 displays the first composite image acquired from the image composition unit 190. Next, the body mark composition unit 200 generates a first composite body mark by compositing the position/orientation information of the ultrasonic tomographic image calculated in step S12050, the information of the first processing-target region calculated in step S12060, and the information of the first cross region calculated in step S12080 on the body mark. Then, the display control unit 210 displays the first composite body mark acquired from the body mark composition unit 200 on the display unit 220. Since the process of step S12080 is equivalent to a combination of the three processes of steps S2070, S2080, and S2090 in the first embodiment, a detailed description thereof will not be given.

(Step S12090: Acquire and Render Second Cross Region)

In step S12090, the cross region calculation unit 180 acquires a second cross region, and outputs it to the image composition unit 190 and body mark composition unit 200. Then, the image composition unit 190 generates a second composite image by superimposing the information of the acquired second cross region on the ultrasonic tomographic image, and the display control unit 210 displays the second composite image acquired from the image composition unit 190. Next, the body mark composition unit 200 generates a second composite body mark by compositing, on the body mark, the following pieces of information:

the position/orientation information of the ultrasonic tomographic image calculated in step S12050;

information of an estimated lesion position estimated in step S12060; and the information of the second cross region calculated in current step S12090.

Then, the display control unit 210 displays the second composite body mark acquired from the body mark composition unit 200 on the display unit 220. Since the process of step S12090 is equivalent to a combination of the three processes of steps S8070, S8080, and S8090 in the second embodiment, a detailed description thereof will not be given.

As described above, the information processing apparatus according to this embodiment displays, on the body mark, the first cross region between the existence region of the corresponding lesion area and the ultrasonic tomographic image when the ultrasonic tomographic image crosses that existence region. On the other hand, when the ultrasonic tomographic image does not cross the existence region, the apparatus switches to display the second cross region between the flush plane region having the same depth as the estimated lesion position and the ultrasonic tomographic image on the body mark. Therefore, when the ultrasonic tomographic image is located outside the existence region of the corresponding lesion area, the user can easily recognize the current position of the ultrasonic tomographic image with respect to the estimated lesion position, and can efficiently operate the ultrasonic probe to a position near the estimated lesion position. Then, when the ultrasonic tomographic image is located inside the existence region of the corresponding lesion area, the user can easily recognize the current position of the ultrasonic tomographic image with respect to that region, and can efficiently search for and identify the corresponding lesion area near the estimated lesion position.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-012434, filed Jan. 24, 2012, which is hereby incorporated by reference herein in its entirety.

What is claimed is:

1. An information processing apparatus comprising:
an ROI acquisition unit configured to acquire a position of an ROI (Region Of Interest) in an object on a reference coordinate system;
a position/orientation acquisition unit configured to acquire a position and an orientation of an ultrasonic tomographic image acquired by an ultrasonic probe;
an estimation unit configured to estimate a corresponding position of the ROI on an ultrasonic coordinate system, whose axes are defined by the plane of the ultrasonic tomographic image, based on at least the position of the ROI acquired by said ROI acquisition unit and the position and the orientation of the ultrasonic tomographic image acquired by said position/orientation acquisition unit;
an existence region calculation unit configured to calculate an existence region, which represents the corresponding position where the ROI may exist on the ultrasonic coordinate system, by expanding an area around the corresponding position estimated by said estimation unit;
a cross region calculation unit configured to calculate a cross region between the existence region calculated by said existence region calculation unit and the ultrasonic tomographic image based on information of the existence region and information of the position and the orientation of the ultrasonic tomographic image acquired by said position/orientation acquisition unit; and
a display control unit configured to display the ultrasonic tomographic image and a body mark indicating a portion to be examined, and to display the existence region calculated by said existence region calculation unit and the cross region calculated by said cross region calculation unit on the body mark.

2. The apparatus according to claim 1, wherein said display control unit further displays information indicating a position of the ultrasonic probe or the ultrasonic tomographic image on the body mark.

3. The apparatus according to claim 1, wherein a target region is a plane region which passes through the position of the ROI, and
wherein said display control unit further displays the position of ROI on the body mark.

4. The apparatus according to claim 1, wherein
a target region is a plane region which passes through the positions of the existence region and the ROI,
when the ultrasonic tomographic image crosses the existence region, said display control unit displays information indicating the cross region between the tomographic image and the existence region on the body mark, and
when the ultrasonic tomographic image does not cross the existence region, said display control unit switches to displays a cross section between the tomographic image and the plane region on the body mark.

5. The apparatus according to claim 1, wherein said display control unit displays a visual representation of a portion to be examined as the body mark.

6. The apparatus according to claim 1, wherein said display control unit displays an approximate outline of a portion to be examined as the body mark.

7. The apparatus according to claim 1, further comprising an error acquisition unit configured to acquire error factor information based on a sensor that detects the position of the ultrasonic probe,
wherein said existence region calculation unit calculates the existence region based on the acquired error factor information.

8. An information processing apparatus comprising:
a target region acquisition unit configured to acquire a three-dimensional target region in an object on a reference coordinate system;
a position/orientation acquisition unit configured to acquire a position and an orientation of an ultrasonic tomographic image acquired by an ultrasonic probe;
an existence region calculation unit configured to calculate an existence region by expanding, to a predetermined range, an area around a corresponding position of the target region on an ultrasonic coordinate system, wherein the existence region indicates a region where the target region may be present;
a cross region calculation unit configured to calculate a cross region between the existence region and the ultrasonic tomographic image based on information of the existence region calculated by said existence region calculation unit and information of the position and the orientation of the ultrasonic tomographic image acquired by said position/orientation acquisition unit; and
a display control unit configured to display the ultrasonic tomographic image and a body mark of a portion to be examined, and to display the existence region calculated by said existence region calculation unit and the cross region calculated by said cross region calculation unit on the body mark.

9. A control method of an information processing apparatus, comprising the steps of:
acquiring a position of an ROI in an object on a reference coordinate system;
acquiring a position and an orientation of an ultrasonic tomographic image acquired by an ultrasonic probe;
estimating a corresponding position of the ROI on an ultrasonic coordinate system, whose axes are defined by the plane of the ultrasonic tomographic image based at least on the position of the acquired ROI and the acquired position and the orientation of the ultrasonic tomographic image;

calculating an existence region, which represents the corresponding position where the ROI may exist on the ultrasonic coordinate system, by expanding an area around the estimated corresponding position;

calculating a cross region between the existence region and the ultrasonic tomographic image based on information of the calculated existence region and information of the acquired position and the orientation of the ultrasonic tomographic image; and displaying the ultrasonic tomographic image and a body mark indicating a portion to be examined, and displaying the calculated existence section and the calculated cross section on the body mark.

10. A control method of an information processing apparatus, comprising the steps of:

acquiring a three-dimensional target region in an object on a reference coordinate system;

acquiring a position and an orientation of an ultrasonic tomographic image acquired by an ultrasonic probe;

calculating an existence region by expanding, to a predetermined range, an area around a corresponding position of the target region on an ultrasonic coordinate system, wherein the existence region indicates a region where the target region may be present;

calculating a cross region between the existence region and the ultrasonic tomographic image based on information of the calculated existence region and information of the acquired position and the orientation of the ultrasonic tomographic image; and displaying the ultrasonic tomographic image and a body mark of a portion to be examined, and displaying the calculated existence region and the calculated cross section on the body mark.

11. An information processing apparatus comprising:

an ROI acquisition unit configured to acquire a position of an ROI (Region Of Interest) in an object;

a position/orientation acquisition unit configured to acquire a position and an orientation of an ultrasonic tomographic image acquired by an ultrasonic probe;

a plane calculation unit configured to calculate a plane which is parallel to a plane of the body mark indicating a portion to be examined and passes through the position of the ROI acquired by said ROI acquisition unit;

a cross region calculation unit configured to calculate a cross region between the plane and the ultrasonic tomographic image based on information of the plane calculated by said the position and the orientation of the tomographic image acquired by said position/orientation acquisition unit; and a display control unit configured to display the tomographic image and a body mark indicating a portion to be examined, and to display the cross section calculated by said calculation unit and the position of the ultrasonic probe on the body mark.

* * * * *